United States Patent [19]
Hirosaki et al.

[11] Patent Number: 5,541,143
[45] Date of Patent: Jul. 30, 1996

[54] SINTERED COMPOSITE OF SILICON CARBIDE AND SILICON NITRIDE

[75] Inventors: Naoto Hirosaki; Yoshio Akimune; Yusuke Okamoto, all of Yokohama, Japan

[73] Assignee: Nissan Motor Co., Ltd., Kanagawa, Japan

[21] Appl. No.: 521,096

[22] Filed: Aug. 29, 1995

[30] Foreign Application Priority Data

Aug. 30, 1994 [JP] Japan ..................... 6-205752

[51] Int. Cl.⁶ .............................. C04B 35/596
[52] U.S. Cl. .............................. 501/92; 501/97
[58] Field of Search .................. 501/92, 97, 98

[56] References Cited

U.S. PATENT DOCUMENTS

| | | | |
|---|---|---|---|
| 4,800,182 | 1/1989 | Izaki et al. | 501/92 |
| 5,026,671 | 6/1991 | Hanzawa et al. | 501/92 X |
| 5,122,485 | 6/1992 | Akimune | 501/92 |
| 5,134,097 | 7/1992 | Nihara et al. | 501/92 |
| 5,312,788 | 5/1994 | Li et al. | 501/97 |
| 5,316,987 | 5/1994 | Yasutomi et al. | 501/97 |
| 5,352,641 | 10/1994 | Matsui et al. | 501/97 X |

OTHER PUBLICATIONS

"Sintering of $Si_3N_4$ with the Addition of Rare–Earth Oxides", by Naoto Hirosaki et al, Communication of the American Ceramic Society, vol. 71, No. 3, pp. C–144 to C–147, 1988.

"Dense Silicon Nitride Containing Low Amounts of $Y_2O_3$ and $Nd_2O_3$", by Naoto Hirosaki et al, Nippon Seramikkusu Kyokai Gakujutsu Ronbunshi, vol. 97, No. 6, pp. 673–675, 1989.

"Fabrication of High Strength β–Sialon by Reaction Sintering", by M. Mitomo et al, Journal of Materials Science, vol. 14, pp. 2309–2316, 1979.

"Fabrication and Microstructure of $Si_3N_4$/Metal–Nitride Nanocomposites", by Jin–Joo Matsui et al, Funtai Oyobi Funmatshu Yakin, vol. 39, No. 12, pp. 1119–1123, 1992.

*Primary Examiner*—Karl Group
*Attorney, Agent, or Firm*—Lowe, Price, LeBlanc & Becker

[57] ABSTRACT

The invention relates to a sintered composite of silicon carbide and silicon nitride. The sintered composite includes a polycrystalline matrix and polycrystalline aggregates dispersed in the matrix. The matrix includes silicon carbide grains, first silicon-nitride grains and a first sintering aid thereof. Each of the aggregates includes second silicon-nitride grains and a second sintering aid thereof. The aggregates have an average diameter within a range from 10 μm to 50 μm. This average diameter is defined as a diameter of a circle having an area which is the same as the average area of the aggregates on a two-dimensional section of the sintered composite. The sintered composite is light in weight and superior in strength and fracture toughness at high temperature as well as at room temperature.

6 Claims, 3 Drawing Sheets

20μm

10μm

SINTERED COMPOSITE OF SILICON CARBIDE AND SILICON NITRIDE

BACKGROUND OF THE INVENTION

1. Field of the Invention

The present invention relates to a sintered composite of silicon carbide and silicon nitride, used as a material for various structural parts in the fields of automobile, mechanical device, chemical device, aerospace device and the like, and a method of producing the sintered composite.

2. Description of the Prior Art

A sintered body containing silicon nitride as a main component thereof is chemically stable at room temperature and a higher temperature. This sintered body has a high mechanical is strength and thus is suitable as a material for bearing, turbocharger rotor and the like. Hitherto, high-strength silicon nitride sintered bodies have been prepared by a liquid-phase sintering at a temperature not lower than 1700° C., using an α-silicon nitride powder and an oxide-type sintering aid. These sintered bodies have high strength and toughness at room temperature. However, the strength of these sintered bodies decreases at a high temperature not lower than 1,000° C., because the added oxide-type sintering aid softens at this high temperature.

For the purpose of improving the above-mentioned silicon nitride sintered body in strength at high temperature, there have been provided the following first, second, third and fourth methods. In the first method, a normal oxide-type sintering aid is replaced by a high-melting-point sintering aid (see J. Am. Ceram. Soc., vol. 71, No. 3, pp. C-114 to C-147, 1988). In the second method, the amount of the oxide-type sintering aid is decreased (see Nippon Seramikkusu Kyokai Gakujutsu Ronbunshi, vol. 97, No. 6, pp. 673–675, 1989). In the third method, a solid solution (sialon) is formed by dissolving the oxide-type sintering aid in silicon nitride grains, after the sintering (see J. Mater. Sci. vol. 14, pp. 2309–2316, 1979). In the fourth method, silicon carbide grains are dispersed at the boundary of and within silicon nitride grains (see Funtai Oyobi Funmatshu Yakin, vol. 39, No. 12, pp. 1119–1123, 1992). These methods are somewhat effective for improving the strength of the silicon nitride sintered body in strength at high temperature.

However, according to the above-mentioned methods, it is not possible to obtain a material which is high in both strength and toughness at high temperature. In fact, according to the first method, MgO as a sintering aid is replaced by $Y_2O_3$. With this, the temperature at which the strength decreases is increased from 1,000° C. (MgO) to 1,200° C. ($Y_2O_3$). However, this improvement in strength at high temperature is still insufficient. According to the second method, the amount of oxide-type sintering aid is decreased from 10 mol % to 1 mol %. With this, the temperature at which the strength decreases is increased from 1,000° C. to 1,200° C. However, this improvement is also insufficient. According to the third method, it is possible to obtain a material of which strength does not deteriorate up to 1,400° C. However, this material has a low fracture toughness not higher than 5MPa√m. A sintered body prepared by the fourth method is also improved in strength at high temperature, but not in toughness.

Thus, there has been an increasing demand for a ceramic composite which is high in strength and toughness at high temperature as well as at room temperature.

SUMMARY OF THE INVENTION

It is an object of the present invention to provide a sintered composite of silicon carbide and silicon nitride, which sintered composite is light in weight and superior in strength and fracture toughness at high temperature as well as at room temperature.

It is another object of the present invention to provide an improved method of producing the sintered composite.

According to a first aspect of the present invention, there is provided a sintered composite of silicon carbide and silicon nitride, said composite comprising:

a polycrystalline matrix including silicon carbide grains, first silicon-nitride grains and a first sintering aid thereof; and polycrystalline aggregates dispersed in said matrix, each of said aggregates including second silicon-nitride grains and a second sintering aid thereof, wherein said aggregates have an average diameter within a range from 10 μm to 50 μm, said average diameter being defined as a diameter of a circle having an area which is the same as the average area of said aggregates on a two-dimensional section of said composite.

According to a second aspect of the present invention, there is is provided a method of producing a sintered composite of silicon carbide and silicon nitride, said method comprising:

(a) mixing a first silicon-nitride powder with 0.2–10% by weight of a first sintering aid, based on the total weight of said first silicon-nitride powder and said first sintering aid, said first sintering aid being at least one oxide or nitride selected from the group consisting of aluminum oxide, magnesium oxide, calcium oxide, zirconium oxide, aluminum nitride, and oxides of elements of the group IIIa of the periodic table of elements, so as to prepare a first powder mixture;

(b) granulating said first powder mixture into first granulated-grains having an average diameter within a range from 10 μm to 50 μm;

(c) mixing a second silicon-nitride powder with 0.2–10% by weight of a second sintering aid and 0.5–30% by weight of a silicon carbide powder, based on the total weight of said second silicon-nitride powder, said second sintering aid and said silicon carbide powder, said second sintering aid being at least one oxide or nitride selected from the group consisting of aluminum oxide, magnesium oxide, calcium oxide, zirconium oxide, aluminum nitride, and oxides of elements of the group IIIa of the periodic table of elements, so as to prepare a second powder mixture;

(d) optionally granulating said second powder mixture into optional second granulated-grains having an average diameter not larger than 100 μm;

(e) mixing 10–60% by weight, based on the total weight of said first granulated-grains and said second powder mixture and/or said optional second granulated-grains, of said first granulated-grains with said second powder mixture and/or said optional second granulated-grains, so as to prepare a composite mixture;

(f) optionally shaping said composite mixture so as to prepare a shaped body; and (g) sintering said composite mixture or said shaped body at a temperature within a range from 1,600° to 2,100° C., so as to prepare said sintered composite.

According to the present invention, there is provided the above-mentioned special sintered composite of silicon carbide and silicon nitride. This sintered composite is light in weight and superior in strength and fracture toughness at high temperature as well as at room temperature.

A conventional composite material has a microstructure where individual primary particles and/or individual primary fibers are dispersed in a polycrystalline matrix. In this conventional composite material, the amount of the dispersed phase and the size thereof are limited, because the enlarged dispersed phase becomes an obstacle to the sintering.

In contrast to the conventional composite material, according to the present invention, the dispersed phase is formed by polycrystalline aggregates of primary particles, not by primary particles themselves. Therefore, during the sintering, dispersed phase (the polycrystalline aggregates) also contracts, not in the case of the conventional composite material, at the same time when the matrix phase does. Thus, according to the present invention, it is possible to conduct the sintering even if a large amount of large-sized aggregates are used as the dispersed phase. With this, the sintered composite becomes superior in strength and fracture toughness at high temperature as well as at room temperature.

DESCRIPTION OF THE PREFERRED INVENTION

Figure 1:
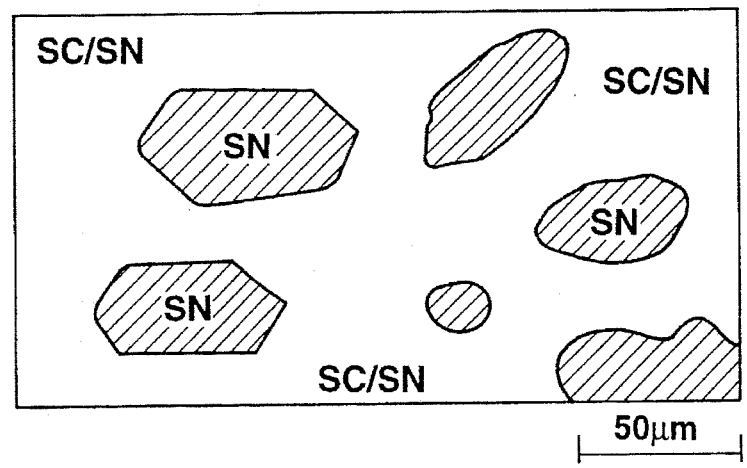
FIG. 1 is a schematic sectional view showing a microstructure of a sintered body according to Example 1 of the present invention, observed by a scanning electron microscope (SEM), where the silicon nitride grain aggregates (SN) are dispersed in the silicon carbide and silicon nitride matrix (SC/SN)
Figure 2:
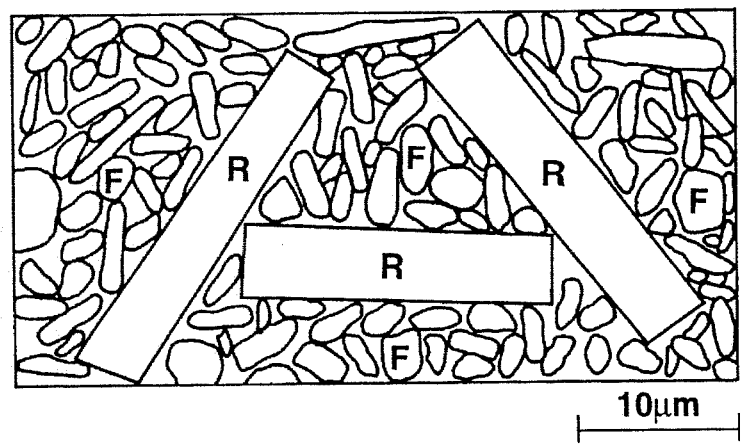
FIG. 2 is an enlarged view of a microstructure of the silicon nitride grain aggregate (SN) of FIG. 1, observed by SEM, showing the silicon-nitride larger grains (R), and silicon-nitride finer grains (F)
Figure 3:
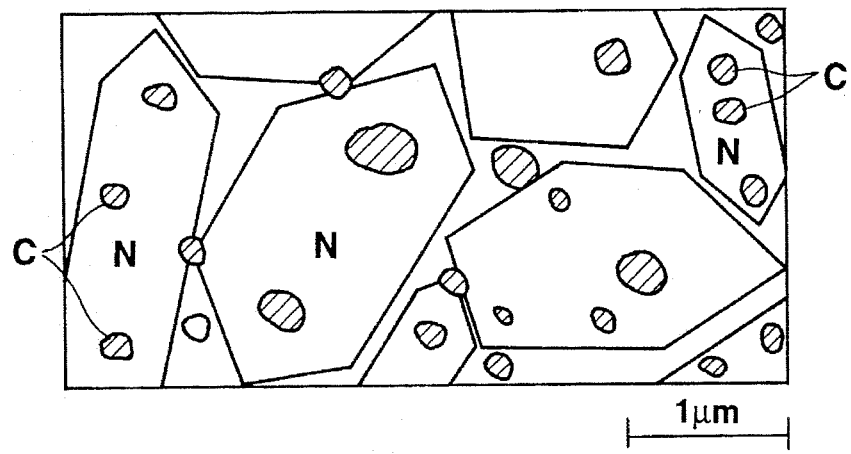
FIG. 3 is an enlarged view of a microstructure of the silicon carbide and silicon nitride matrix (SC/SN) of FIG. 1, observed by a transmission electron microscope, showing that the silicon carbide grains (C) are dispersed at the boundary of and within the first silicon-nitride grains (N)

With reference to FIGS. 1–3, a sintered composite according to the present invention will be described in the following.

As is seen from FIG. 1, there is provided a sintered composite of silicon carbide and silicon nitride according to the present invention. This sintered composite comprises: a polycrystalline matrix (SC/SN) and polycrystalline aggregates (SN) dispersed in the matrix.

As is seen from FIG. 3 which is an enlarged view of a microstructure of the matrix (SC/SN) of FIG. 1, the matrix (SC/SN) includes silicon carbide grains (C), first silicon-nitride grains (N) and a first sintering aid thereof. In fact, the first sintering aid is distributed at the grain boundary of the matrix (SC/SN). The silicon carbide grains (C) are dispersed at the boundary of and within the first silicon-nitride grains (N), as illustrated in FIG. 3.

As is seen from FIG. 2 which is an enlarged view of a microstructure of each aggregate (SN) of FIG. 1, each aggregate includes second silicon-nitride grains (R, F) and a second sintering aid thereof. The second sintering aid is distributed at the grain boundary of the second silicon-nitride grains (R, F).

In the invention, as is schematically shown in FIG. 1, the aggregates (SN) have an average diameter within a range from 10 μm to 50 μm. This average diameter is defined as the diameter of a circle having an area which is the same as the average area (S) of the aggregates on a two-dimensional section of the sintered composite. In other words, the average diameter of the aggregates is found by the following equation:

$$d = 2\sqrt{\frac{S}{\pi}} \; (\mu m)$$

where d (μm) is the average diameter of the aggregates, S (μm²) is the average area of the aggregates on a two-dimensional section of the sintered composite, and π is the ratio of the circumference of the circle to its diameter.

In the invention, it is preferable that the second silicon-nitride grains (R, F) comprises larger columnar grains (R) made of $\beta\text{-}Si_3N_4$, as illustrated in FIG. 2. These larger grains (R) have an average diameter within a range from 3 μm to 10 μm and an average axial length within a range from 10 μm to 50 μm. The thus-sized larger grains (R) improve the toughness of the sintered composite. Furthermore, it is preferable that the total area of the larger grains (R) on the two-dimensional section of the sintered composite is within a range from 5% to 40% by area, based on the total area of the aggregates on the section. Within this range, the toughness of the sintered composite is further improved. If it is less than 5% by area, the toughness may not be so improved. If it is more than 40% by area, the sintered composite may be lowered in strength.

In the invention, as is illustrated in FIG. 2, it is preferable that the second silicon-nitride grains (R, F) further comprises finer grains (F). Thus, the sintered composite has a microstructure where the larger grains (R) having an average axial length within a range from 10 to 50 μm coexist with the first silicon-nitride grains (N) and the finer grains (F), both of which are smaller than the larger grains (R) in size. With this microstructure, the sintered composite becomes further improved in strength and toughness.

As is mentioned hereinbefore, the average diameter of the aggregates is within a range from 10 to 50 μm. If this is smaller than 10 μm, the average axial length of the larger grains (R) becomes smaller than 10 μm. With this, the amount of the larger grains (R) having the axial length of 10–50 μm becomes insufficient. Thus, the toughness of the sintered composite may be lowered. If the average diameter of the aggregates is larger than 50 μm, the average axial length of the larger grains (R) may become larger than 50 μm. With this, the strength of the sintered composite may be lowered.

In the invention, it is preferable that the total area of the aggregates on the two-dimensional section is within a range from 10% to 60% by area, based on the total area of the section. With this, the sintered composite becomes further improved in both toughness and strength. If it is smaller than 10% by area, the amount of the larger grains (R) relative to the amount of the aggregates (SN) may become too low. With this, the toughness of the sintered composite may be lowered. If it is larger than 60% by area, the amount of the silicon carbide grains (C) may become too small. With this, the strength of the sintered composite at high temperature may be lowered.

In the invention, the second-nitride grains (F, R) may further comprise still-larger columnar grains (not shown in FIG. 2) which are made of $\beta$-$Si_3N_4$ and have an average axial length longer than 50 µm. However, it is preferable that the total area of the still-larger grains on the two-dimensional section is within a range from 0 to 5% by area, based on the total area of the aggregates on the section. Within this range, the sintered composite becomes further improved in strength.

In the invention, it is preferable that the silicon carbide grains (C) have an average diameter within a range from 0.01 µm to 1.0 µm. If it is less than 0.01 µm, the compactibility for preparing the compact (shaped body) may become inferior. If it is more than 1.0 µm, the sinterability may become inferior. Furthermore, it is preferable that the total volume of the silicon carbide grains (C) is within a range from 0.5 to 30%, based on the total volume of the sintered composite. If it is less than 0.5%, the advantage of the addition of the silicon carbide (C) may become unobtrusive. Thus, the sintered composite may be lowered in strength. If it is greater than 30%, the sinterability may become inferior.

In the invention, a method of producing the above-mentioned sintered composite is not limited to a particular one. In the following, an exemplary method of producing the sintered composite will be described. This method comprises:

(a) mixing a first silicon-nitride powder with 0.2–10% by weight of a first sintering aid, based on the total weight of the first silicon-nitride powder and the first sintering aid, the first sintering aid being at least one oxide or nitride selected from the group consisting of aluminum oxide, magnesium oxide, calcium oxide, zirconium oxide, aluminum nitride, and oxides of elements of the group IIIa of the periodic table of elements, so as to prepare a first powder mixture;

(b) granulating the first powder mixture into first granulated-grains having an average diameter within a range from 10 µm to 50 µm;

(c) mixing a second silicon-nitride powder with 0.2–10% by weight of a second sintering aid and 0.5–30% by weight of a silicon carbide powder, based on the total weight of the second silicon-nitride powder, the second sintering aid and the silicon carbide powder, the second sintering aid being at least one oxide or nitride selected from the group consisting of aluminum oxide, magnesium oxide, calcium oxide, zirconium oxide, aluminum nitride, and oxides of elements of the group IIIa of the periodic table of elements, so as to prepare a second powder mixture;

(d) optionally granulating the second powder mixture into optional second granulated-grains having an average diameter not larger than 100 µm;

(e) mixing 10–60% by weight, based on the total weight of the first granulated-grains and the second powder mixture and/or the optional second granulated-grains, of the first granulated-grains with the second powder mixture and/or the optional second granulated-grains, so as to prepare a composite mixture;

(f) optionally shaping the composite mixture so as to prepare a shaped body; and (g) sintering the composite mixture or the shaped body at a temperature within a range from 1,600° to 2,100° C., so as to prepare the sintered composite.

At the step (b) of the above method, the granulation method and the shape of the first granulated-grains are not limited to particular ones. For example, it is possible to prepare the first granulated-grains which are spherical in shape, by using a spray dryer. If necessary, it is optional to control the size of the first granulated-grains, by the particle size classification through wind or sieve.

In the invention, as is described in the step (d) of the above method, it is optional to granulate the second powder mixture into the second granulated-grains having an average diameter not larger than 100 µm. In other words, it is optional not to prepare the second granulated-grains. In this case, at the step (e) of the above method, the first granulated-grains are mixed with only the second powder mixture. Furthermore, it is further optional to granulate a portion of the second powder mixture into the second granulated-grains. In this case, at the step (e), the first granulated-grains are mixed with both of the second powder mixture and the second granulated-grains. It is still further optional to granulate the total amount of the second powder mixture into the second granulated-grains. In this case, at the step (e), the first granulated-grains are mixed with only the second granulated-grains.

At the step (b), the mixing method is not limited to a particular one. For example, it is known to use a V type mixer.

In the invention, it is preferable to use, as each of the first and second sintering aids, a mixture of yttrium oxide and neodymium oxide, for improving the sintered composite in strength at high temperature. It is also preferable to use, as each of the first and second sintering aids, a mixture of yttrium oxide and aluminum oxide, for improving sinterability. This mixture is preferably used in a case where hot-pressing is not used in the sintering. As is described at the steps (a) and (c) of the above method, the amount of each of the first and second sintering aids is 0.2–10 wt %. If the amount of the first sintering aid is less than 0.2 wt %, the aggregates (SN) do not become sufficiently compacted. If it is greater than 10 wt %, the strength of the aggregates (SN) is lowered, thereby lowering the strength of the sintered composite, too. If the amount of the second sintering aid is less than 0.2 wt %, the matrix does not become sufficiently compacted. If it is greater than 10 wt %, the matrix strength is lowered, thereby lowering the strength of the sintered composite, too.

In the invention, it is preferable that the first silicon-nitride powder contains at least 80 wt % of $\beta$-silicon nitride. With this, the reproducibility of the above-mentioned special microstructure is improved. The reason of this is that a larger content of $\beta$-silicon nitride causes the phase transition during the sintering.

In the invention, it is preferable that the first silicon-nitride powder comprises 70–95 wt % of first particles having a diameter not larger than 0.8 µm, and 5–30 wt % of second particles having a diameter within a range from 1.5–5 µm. With this, it is possible to improve the growth of the second particles into the above-mentioned columnar larger grains (R). In fact, the second particles serves as nuclei in this growth. If the second particles content is less than 5 wt %, the growth may become poor. If the second particles content is more than 30 wt %, the amount of the larger grains (R) may become too much. With this, the strength of the sintered composite may become inferior. It is preferable that the first silicon-nitride powder is prepared, by grinding and then classifying a starting powder, or by mixing a plurality of starting powders having certain different particle diameters.

In the invention, at the step (c) of the above method, if the amount of the silicon carbide powder is less than 0.5 wt %, the sintered composite is not so improved in strength at high temperature. If it is greater than 30 wt %, the sinterability of the matrix of the sintered composite becomes inferior.

The average diameter of the silicon carbide powder is not limited to a particular range. However, if it is within a range from 0.01 μm to 1 μm, the sintered composite is much improved in strength at high temperature. If it is smaller than 0.01 μm, it may become difficult to properly conduct the mixing and the compaction. If it is larger than 1 μm, the improvement in strength at high temperature becomes less.

As is described at the step (d) of the above method, when the second granulated-grains are optionally used in the invention, the diameter of the same is not larger than 100 μm. If it is larger than 100 μm, the improvement of the sintered composite in toughness becomes less.

At the step (e) of the above method, if the amount of the first granulated-grains is less than 10 wt %, the amount of the same becomes too low and thus the sintered composite is lowered in toughness. It is more than 60 wt %, the individual first granulated-grains do not become well dispersed. With this, the sintered composite is lowered in strength at high temperature. The microstructure of the sintered composite could be varied not only by the mixing ratio of the first granulated-grains to the second powder mixture and/or the optional second granulated-grains, but also by the contraction behavior of the first granulated-grains and the second powder mixture and/or the second granulated-grains. Even if the amount of the first granulated-grains is more than 50 wt % at the step (e), the first granulated-grains become well dispersed in the sintered composite provided that the first granulated-grains contract earlier than the second powder mixture and/or the second granulated-grains do.

At the step (f) of the above method, the shaping method is not limited to a particular one. Examples of this method are metal molding, injection molding and casting molding. In case that hot-pressing is taken as the sintering method, this step (f) can be omitted.

At the step (g) of the above method, the sintering method is not limited to a particular one. It is preferable to select a suitable sintering method according to the composition and the shape of the sintered composite. When the sintering temperature is within a range from 1,600° to 2,100° C., it is possible to obtain a well compacted sintered composite. Irrespective of the sintering method, if the sintering temperature is lower than 1,600° C., the sintered composite does not become well compacted. If the sintering temperature is higher than 2,100° C., the sintered composite is lowered in strength due to the growth of the first silicon-nitride grains of the matrix.

When it is intended to prepare a product (the sintered composite) having a simple shape, hot-pressing is suitable as the sintering method. In hot-pressing, the composite mixture (a mixture of the first granulated-grains and the second powder mixture and/or the second granulated-grains) is put into a graphite mold. Then, it is sintered in an atmosphere of nitrogen gas under a pressure within a range from 1 to 100 atmospheric pressure, under a load of a uniaxial pressure within a range from 5 to 50 MPa. If the nitrogen gas pressure is lower than 1 atm., silicon nitride is thermally decomposed. If it is higher than 100 atm., the sintered composite tends to have pores therein. If the uniaxial pressure is lower than 5 MPa, the sintered composite does not become well compacted. If it is higher than 50 MPa, the composite mixture reacts with the graphite mold. With this, it may become difficult to take out the sintered composite from the mold.

When it is intended to prepare a product having a complicated shape and the composition has a relatively good sinterability, the gas pressure sintering is suitable as the sintering method. In this case, the sintering is conducted under a nitrogen gas pressure within a range from 1 to 500 atm. If it is lower than 1 atm., silicon nitride or the sintering aid may be thermally decomposed. With this, sinterability is lowered. If it is higher than 500 atm., a high-pressure gas is kept in the sintered composite. With this, sinterability is lowered.

When it is intended to prepare a product having a complicated shape and the composition is inferior in sinterability, the hot isostatic press (HIP) is suitable as the sintering method. In this case, the shaped body is sealingly put into a capsule made of glass or the like impermeable to gas. Then, HIP is conducted under a gas pressure from 100 to 2,000 atm. Alternatively, at first, the gas pressure sintering is conducted to obtain a preliminarily sintered composite having a density of at least 95%, and then this sintered composite is further sintered by HIP under a gas pressure from 100 to 2,000 atm., without putting this sintered composite into the capsule. If the gas pressure is lower than 100 atm. in HIP, the sintered composite does not become well compacted. If it is higher than 2,000 atm. in HIP, it may be necessary to use a special pressure-proof equipment. If the preliminarily sintered composite has a density less than 95%, the gas may penetrate into the sintered composite. With this, the sintered composite does not become well compacted.

The present invention will be further described with reference to the following nonlimitative examples.

EXAMPLE 1

In this example, first granulated-grains were obtained as follows. At first, 98 wt % of a first silicon nitride powder having an average diameter of 0.5 μm, an oxygen content of 1.5 wt % and a β-silicon nitride content of 90 wt % was mixed with 0.8 wt % of yttrium oxide and 1.2 wt % of neodymium oxide, so as to prepare a first powder mixture. This mixture was well mixed and ground by a wet ball mill with ethanol (grinding aid) for 94 hr. Then, this mixture was dried in air by a spray dryer. With this, first granulated-grains having an average diameter of 30 μm were obtained.

Separately, second granulated-grains were obtained as follows. At first, 90 wt % of a second silicon nitride powder having an average diameter of 1.2 μm, an oxygen content of 1.0 wt % and a β-silicon nitride content of 5 wt % was mixed with 2.4 wt % of yttrium oxide, 3.6 wt % of neodymium oxide and 4.0 wt % of a silicon carbide powder having an average diameter of 0.03 μm, so as to prepare a second powder mixture. Then, this mixture was well mixed and ground by a wet ball mill with ethanol for 94 hr. Then, this mixture was dried in air by a spray dryer. With this, second granulated-grains having an average diameter of 25 μm were obtained.

Then, the thus prepared first and second granulated-grains were mixed together at a weight ratio of the former to the latter of 30:70 by a V type mixer for 60 min, so as to prepare a composite mixture. Then, this composite mixture was shaped by a metal mold under a pressure of 20 MPa, followed by a rubber press under a pressure of 200 MPa. With this, a shaped body having three dimensions of 6 mm×6 mm×50 mm was obtained.

Then, this shaped body was sintered by gas pressure sintering. In fact, it was sintered in a gas pressure furnace of graphite, under a nitrogen gas pressure of 10 atm. at 1,900°

C. for 4 hr, thereby obtaining a sintered composite. This sintered composite was ground with a diamond wheel of 800 mesh into a first sample having a size of three dimensions of 3 mm×4 mm×40 mm. This first sample was subjected to a three-point bending test at room temperature and 1,400° C. according to JIS R1601, and further to a SEPB test according to JIS R1607 to determine the fracture toughness. The SEPB test was conducted as follows. A so-called Vickers' indentation as used in a Vickers hardness test was formed on the surface having dimensions of 3 mm×40 mm, of the sample. A previous crack was formed from this indentation, and then fracture of the sample was made from the previous crack. As shown in Table 1, the sintered composite was superior in strength at high temperature and toughness.

Then, the first sample was ground at its surface having dimensions of 3 mm×4 mm into a mirror surface. Then, this surface was treated with a plasma etching process for 2 min in a $CF_4$ gas containing 7% oxygen gas, with an output of 40 W. The thus etched surface was observed with a SEM equipped with an element analyzer (EPMA). The observation result is schematically shown in FIG. 1. It was confirmed that the individual aggregates (SN) were surrounded by the matrix (SC/SN). By an image analysis, the average diameter and the percentage by area of the aggregates (SN), based on the total area of the two-dimensional section, were determined. The results are shown in Table 1.

Furthermore, the microstructure of the aggregates (SN) was observed with the SEM with a further magnification. This observation result is schematically shown in FIG. 2. It was confirmed that the microstructure is composed of the larger grains (R) and the finer grains (F). These larger grains (R) were made of $\beta$-$Si_3N_4$ and had an average diameter within a range from 3 to 10 µm and an average axial length within a range from 10 to 50 µm. The percentage by area of the larger grains (R), based on the total area of the aggregates (SN), and the percentage by area of still-larger grains (not shown in FIG. 2) having an axial length longer than 50 µm, based on the total area of the aggregates (SN), were determined. The results are shown in Table 1.

Then, the above sintered composite was cut into a thin piece having a thickness of 50 µm. This thin piece was subjected to an ion mill treatment by argon ion. Then, the thus treated piece was observed with a transmission electron microscope (TEM). The observation result of the matrix (SC/SN) with TEM is schematically shown in FIG. 3. It was confirmed that silicon carbide grains (C) are dispersed within silicon nitride grains (N) and in the grain boundary phase of the same (N).

COMPARATIVE EXAMPLE 1-1

In this comparative example, Example 1 was repeated except in that the sintered composite was prepared from only the first granulated-grains of Example 1, by omitting the second granulated-grains.

In fact, a shaped body having the same size as that of Example 1 was prepared from the first granulated-grains in the same manner as in Example 1. Then, a sintered composite was prepared from this shaped body. The three-point bending test was conducted in the same manner as in Example 1. The test results are shown in Table 1. As shown in Table 1, the sintered composite was inferior in strength at high temperature.

Figure 4:
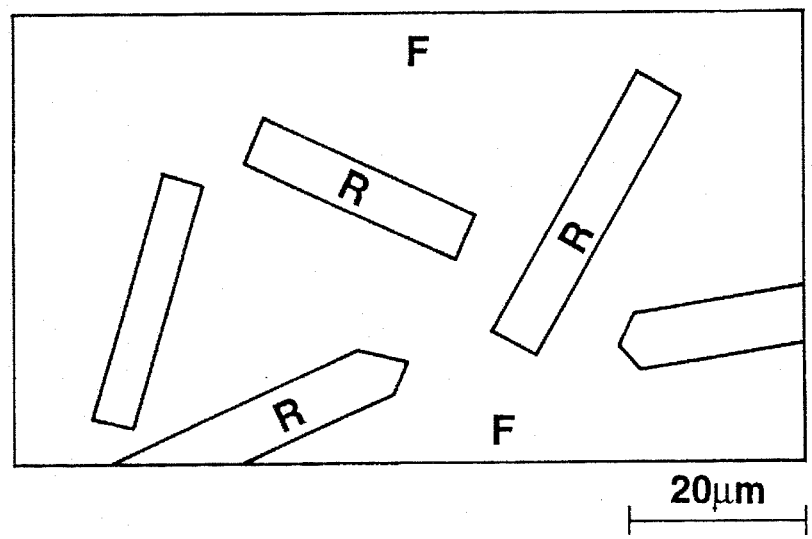
FIG. 4 is a schematic sectional view showing a microstructure of a sintered body according to Comparative Example 1-1 of the present application, observed by SEM, where the silicon-nitride larger grains (R) are dispersed in the silicon nitride matrix (F)

Then, similar to Example 1, the plasma etched surface of the sample was observed with the SEM. The observation result is schematically shown in FIG. 4. As shown in FIG. 4, the microstructure of the sample was composed of only the larger grains (R) of silicon nitride and the finer grains (F) of silicon nitride. In FIG. 4, the individual finer grains (F) are omitted for simplicity.

Figure 5:
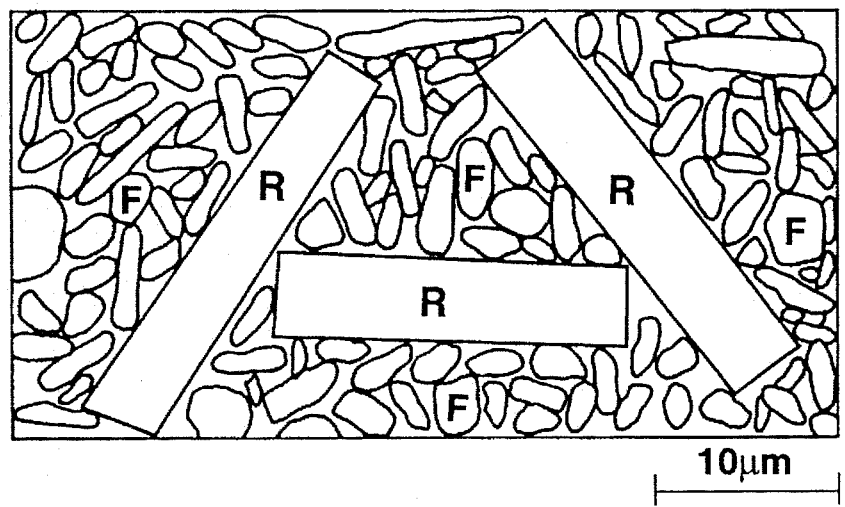
FIG. 5 is an enlarged view of the microstructure of FIG. 4, observed by SEM, showing the silicon-nitride larger grains (R), and the silicon-nitride finer grains (F)

Then, similar to Example 1, the microstructure of the silicon-nitride sintered composite was observed with the SEM with a further magnification. This observation result is schematically shown in FIG. 5. It was confirmed that the microstructure is composed of the larger grains (R) and the finer grains (F). By an image analysis, the same measurements as those of Example 1 were conducted. The results are shown in Table 1.

In an analysis with the elements analyzer, carbon was not detected and thus it was confirmed that the sample does not contain silicon carbide.

COMPARATIVE EXAMPLE 1-2

In this comparative example, Example 1 was repeated except in that the sintered composite was prepared from only the second granulated-grains of Example 1, by omitting the first granulated-grains. As shown in Table 1, the sintered composite was inferior in toughness.

Figure 6:
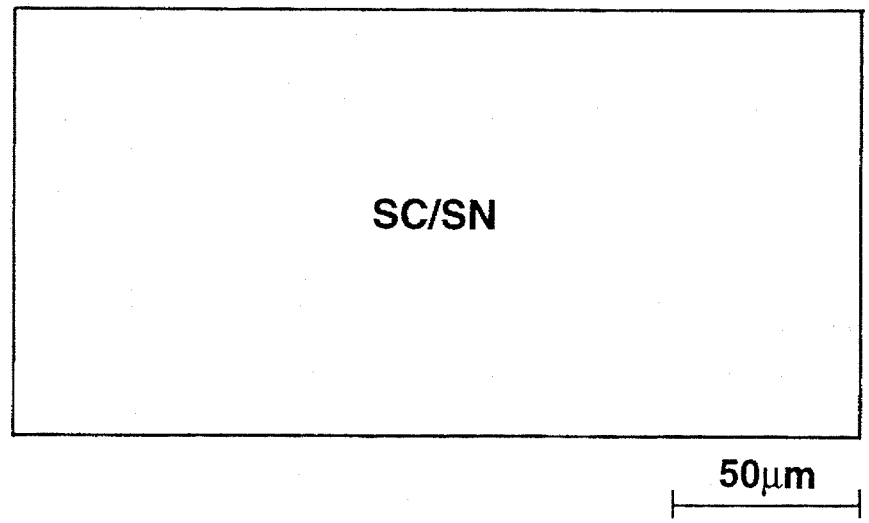
FIG. 6 is a schematic sectional view of a microstructure of a sintered body according to Comparative Example 1-2 of the present application, observed by SEM, showing only the silicon carbide and silicon nitride matrix (SC/SN)

Similar to Example 1, the plasma etched surface was observed with the SEM. The observation result is schematically shown in FIG. 6. As shown in FIG. 6, the sample was composed of only a composite structure (SC/SN) of silicon carbide and silicon nitride. In FIG. 6, the individual grains are omitted for simplicity. In an analysis with the elements analyzer, carbon was detected and thus it was confirmed that the sample contains silicon carbide. By an image analysis, the same measurements as those of Example 1 were conducted. The results are shown in Table 1. In the observation, the still-larger grains made of $\beta$-$Si_3N_4$ and having an axial length longer than 50 µm were not found.

Figure 7:
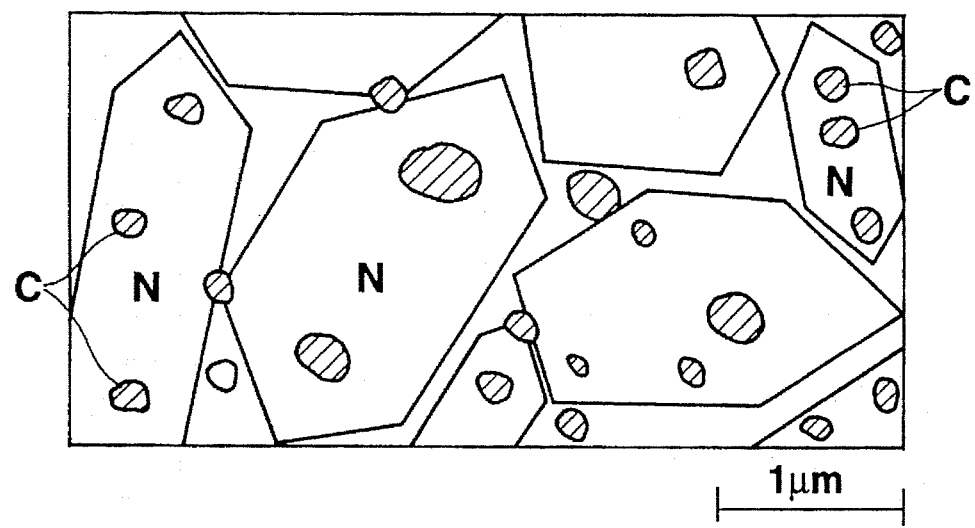
FIG. 7 is an enlarged view of a microstructure of the matrix of FIG. 6, observed by SEM, where the silicon carbide grains (C) are dispersed at the boundary of and within the first silicon nitride grains (N).

Then, similar to Example 1, the ion-mill treated piece was observed with the TEM. The observation result is schematically shown in FIG. 7. As shown in FIG. 7, silicon carbide grains (C) were dispersed within the silicon nitride grains (N) and at the grain boundary of the same (N).

EXAMPLE 2

In this example, Example 1 was slightly modified as follows. That is, the first and second granulated-grains were modified in their compositions and their mixing ratio, and hot-pressing was used in place of gas pressure sintering.

First granulated-grains were obtained as follows. At first, 85 wt % of the first silicon nitride powder of Example 1 was mixed 10 wt % of another silicon nitride powder having an average diameter of 3.5 µm, an oxygen content of 0.5 wt % and a $\beta$-silicon nitride content of 95 wt %, 3.0 wt % of yttrium oxide and 2.0 wt % of aluminum oxide, so as to prepare a first powder mixture. This mixture was well mixed and ground by a wet ball mill with ethanol as a grinding aid for 94 hr. Then, the particle size distribution of this mixture was analyzed with a laser-diffraction type particle size analyzer. By this analysis, it was found that the first powder mixture contains 90 wt % of first particles not larger than 0.8 µm in diameter, and 5 wt % of second particles within a range from 1.5 to 5 µm in diameter. Then the first powder mixture was dried in air by a spray dryer. With this, first granulated-grains having an average diameter of 45 µm were obtained.

Separately, second granulated-grains were obtained as follows. At first, 76 wt % of the second silicon nitride powder was mixed with 6.0 wt % of yttrium oxide, 3.0 wt % of aluminum oxide and 15.0 wt % of silicon carbide powder having an average diameter of 0.5 µm, so as to prepare a second powder mixture. Then, this mixture was well mixed and ground and then dried in the same manner as in Example 1. With this, second granulated-grains having an average diameter of 15 µm were obtained.

Then, the thus prepared first and second granulated-grains were mixed together at a weight ratio of the former to the latter of 50:50 by a V type mixer for 60 min, so as to prepare a composite mixture. Then, this composite mixture was put into a graphite mold having a shape capable of producing a sintered body having dimensions of 50 mm×50 mm. Then, this composite mixture was sintered by hot-pressing under 1 atm. of nitrogen gas, under a load of a uniaxial pressure of 20 MPa at 1750° C. for 2 hr, so as to obtain a sintered composite. Then, this sintered composite was ground in the same manner as that of Example 1, thereby obtaining a first sample having the same size as that of Example 1. This first sample was subjected to the three-point bending test in the same manner as that of Example 1. The test results are shown in Table 1. As shown in Table 1, the sintered composite was superior in strength at high temperature and toughness.

Then, similar to Example 1, the plasma etched surface of the first sample was observed with the SEM. The observation result was similar to that shown in FIG. 1. By an image analysis, the same measurements as those of Example 1 were conducted. The results are shown in Table 1.

Furthermore, similar to Example 1, the microstructure of the aggregates (SN) was observed with the SEM with a further magnification. It was confirmed that the microstructure is composed of the larger grains (R) and the finer grains (F). By an image analysis, the same measurements as those of Example 1 were conducted. The results are shown in Table 1.

COMPARATIVE EXAMPLE 2-1

In this comparative example, Example 2 was repeated except in that the sintered composite was prepared from only the first granulated-grains of Example 2, by omitting the second granulated-grains.

In fact, the first granulated-grains of Example 2 was sintered in the same manner as in Example 2. The three-point bending test was conducted in the same manner as in Example 1. The test results are shown in Table 1. As shown in Table 1, the sintered composite was inferior in strength at high temperature.

Then, similar to Example 1, the plasma etched surface of the sample was observed with the SEM. The observation result was similar to that shown in FIG. 4. By an image analysis, the same measurements as those of Example 1 were conducted. The results are shown in Table 1.

COMPARATIVE EXAMPLE 2-2

In this comparative example, Example 2 was repeated except in that the sintered composite was prepared from only the second granulated-grains of Example 2, by omitting the first granulated-grains.

In fact, the second granulated-grains of Example 2 was sintered in the same manner as in Example 2. The three-point bending test was conducted in the same manner as in Example 1. The test results are shown in Table 1. As shown in Table 1, the sintered composite was inferior in toughness.

Then, similar to Example 1, the plasma etched surface of the sample was observed with the SEM. The observation result was similar to that shown in FIG. 6. By an image analysis, the same measurements as those of Example 1 were conducted. The results are shown in Table 2. In the observation, the still-larger grains were not found.

EXAMPLE 3

In this example, Example 1 was slightly modified as follows. That is, the first granulated-grains were modified in composition; the second powder mixture was used in place of the second granulated-grains; and hot isostatic press was used in place of gas pressure sintering.

First granulated-grains were obtained as follows. At first, 99 wt % of the first silicon nitride powder of Example 1 was mixed with 0.4 wt % of yttrium oxide and 0.6 wt % of neodymium oxide, so as to prepare a first powder mixture. The first granulated-grains having an average diameter of 12 µm were prepared from the first powder mixture, in substantially the same manner as in Example 1. In fact, after the drying, granulated grains were sieved to obtain the first granulated-grains of the above diameter.

Separately, a second powder mixture was obtained as follows. At first, 91 wt % of the second silicon nitride powder of Example 1 was mixed with 3.2 wt % of yttrium oxide, 4.8 wt % of neodymium oxide and 1.0 wt % of a silicon carbide powder having an average diameter of 0.5 µm, so as to prepare the second powder mixture. Then, this mixture was well mixed and ground in the same manner as in Example 1. Then, the mixture was dried by a rotary evaporator. Then, the dried mixture was made loose and then sieved. With this, the second powder mixture was obtained.

Then, the thus prepared first granulated-grains and the second powder mixture were mixed together at a weight ratio of the former to the latter of 60:40 by a V type mixer for 60 min, so as to prepare a composite mixture. Then, this composite mixture was subjected to a rubber press under a pressure of 200 MPa to obtain a shaped body having dimensions of 30 mm×30 mm×50 mm. Then, this shaped body was sealingly put into a glass tube. Then, this glass tube was set in a hot isostatic press machine to conduct a sintering. In this sintering, at first, the glass tube was heated under a nitrogen gas of 1 atm., until 1,400° C.; then both the temperature and the pressure were gradually increased; and then the glass tube was heated at 1,900° C. under a nitrogen gas of 100 atm. for 2 hr, thereby obtaining a sintered composite.

Then, this sintered composite was ground in the same manner as that of Example 1, thereby obtaining a first sample having the same size as that of Example 1. This first sample was subjected to the three-point bending test in the same manner as that of Example 1. The test results are shown in Table 2. As shown in Table 2, the sintered composite was superior in strength at high temperature and toughness.

Then, similar to Example 1, the plasma etched surface of the first sample was observed with the SEM. The observation result was similar to that shown in FIG. 1. By an image analysis, the same measurements as those of Example 1 were conducted. The results are shown in Table 2.

Furthermore, similar to Example 1, the microstructure of the aggregates (SN) was observed with the SEM with a further magnification. By an image analysis, the same measurements as those of Example 1 were conducted. The results are shown in Table 2.

EXAMPLE 4

In this example, Example 1 was slightly modified as follows. That is, the first granulated-grains were modified in their composition; and the second powder mixture of Example 3 was used in place of the second granulated-grains.

First granulated-grains were obtained as follows. At first, 91 wt % of the first silicon nitride powder of Example 1 was mixed with 6.0 wt % of yttrium oxide and 3.0 wt % of aluminum oxide, so as to prepare a first powder mixture. The first granulated-grains having an average diameter of 50 μm were prepared from the first powder mixture, in the same manner as in Example 1.

Then, the thus prepared first granulated-grains and the second powder mixture of Example 3 were mixed together at a weight ratio of the former to the latter of 20:80 by a V type mixer for 60 min, so as to prepare a composite mixture. Then, this composite mixture was subjected to a rubber press in the same manner as in Example 1 and then to a gas pressure sintering in the same manner as in Example 1, so as to obtain a sintered composite.

Then, this sintered composite was ground in the same manner as that of Example 1, thereby obtaining a first sample having the same size as that of Example 1. This first sample was subjected to the three-point bending test in the same manner as that of Example 1. The test results are shown in Table 2. As shown in Table 2, the sintered composite was superior in strength at high temperature and toughness.

Then, similar to Example 1, the plasma etched surface of the first sample was observed with the SEM. By an image analysis, the same measurements as in Example 1 were conducted. The results are shown in Table 2.

Furthermore, similar to Example 1, the microstructure of the aggregates (SN) was observed with the SEM with a further magnification. By an image analysis, the same measurements as in Example 1 were conducted. The results are shown in Table 2.

EXAMPLE 5

In this example, Example 1 was slightly modified as follows. That is, the first and second granulated-grains were modified in their compositions and their mixing ratio; and the gas pressure sintering was modified in its condition.

First granulated-grains were obtained as follows. At first, 92 wt % of the first silicon nitride powder of Example 1 was mixed with 4.0 wt % of lanthanum oxide and 2.0 wt % of magnesium oxide, so as to prepare a first powder mixture. The first granulated-grains having an average diameter of 30 μm were prepared from the first powder mixture, in the same manner as in Example 1.

Second granulated-grains were obtained as follows. At first, 63 wt % of the second silicon nitride powder of Example 1 was mixed with 4.0 wt % of yttrium oxide, 3.0 wt % of aluminum oxide and 30.0 wt % of a silicon carbide powder having an average diameter of 0.05 μm, so as to prepare a second powder mixture. Then, the second granulated-grains were prepared from the second powder mixture, in the same manner as in Example 1.

Then, the thus prepared first and second granulated-grains were mixed together at a weight ratio of the former to the latter of 20:80 by a V type mixer for 60 min, so as to prepare a composite mixture. Then, this composite mixture was subjected to a rubber press in the same manner as in Example 1. Then, a gas pressure sintering was conducted at a temperature of 2,000° C. under a gas pressure of 100 atm., for 2 hr, so as to obtain a sintered composite.

Then, this sintered composite was subjected to the same treatments as those of Example 1. Then, the same measurements as those of Example 1 were conducted. The results are shown in Table 2.

EXAMPLE 6

In this example, Example 1 was slightly modified as follows. That is, the second powder mixture of Example 3 was used in place of the second granulated-grains; and hot-pressing was used in place of gas pressure sintering.

The first granulated-grains of Example 1 were mixed with the second granulated-grains of Example 3 at a weight ratio of the former to the latter of 30:70 by a V type mixer for 60 min, so as to prepare a composite mixture. Then, this composite mixture was subjected to the same hot-pressing as in Example 2, except in that the sintering temperature was 1,800° C. in place of 1,750° C. and that the pressure load was 50 MPa in place of 20 MPa, so as to obtain a sintered composite.

Then, this sintered composite was subjected to the same treatments as those of Example 1. Then, the same measurements as those of Example 1 were conducted. The results are shown in Table 2.

EXAMPLE 7

In this example, Example 1 was slightly modified as follows. That is, the first and second granulated-grains of Example 2 were used; and hot-pressing was used in place of gas pressure sintering.

The first and second granulated-grains of Example 2 were mixed together at a weight ratio of the former to the latter of 55:45 by a V type mixer for 60 min, so as to prepare a composite mixture. Then, this composite mixture was subjected to the same hot-pressing as in Example 6, except in that the gas pressure was 10 atm. in place of 1 atm., so as to prepare a sintered composite.

Then, this sintered composite was subjected to the same treatments as those of Example 1. Then, the same measurements as those of Example 1 were conducted. The results are shown in Table 2.

EXAMPLE 8

In this example, Example 1. was slightly modified as follows. That is, the first granulated-grains of Example 3 and the second powder mixture of Example 3 were used; and the gas pressure sintering was modified in its condition.

The first granulated-grains of Example 3 were mixed with the second powder mixture of Example 3 at a weight ratio of the former to the latter of 30:70 by a V type mixer for 60 min, so as to prepare a composite mixture. Then, this composite mixture was subjected to the same rubber press as in Example 1. Then, the same gas pressure sintering as in Example 1 was conducted, except in that the sintering temperature was 2,100° C., that the sintering time was 1 hr, and that the gas pressure was 300 atm., so as to prepare a sintered composite.

Then, this sintered composite was subjected to the same treatments as those of Example 1. Then, the same measurements as those of Example 1 were conducted. The results are shown in Table 2.

COMPARATIVE EXAMPLE 3

In this comparative example, Example 1 was slightly modified as follows. That is, the first and second granulated-grains were modified in their composition and their mixing ratio; and hot-pressing was used in place of gas pressure sintering. In fact, the first granulated-grains of this comparative example had an average diameter (60 μm) which is out of the range (10–50 μm) according to the invention.

First granulated-grains were prepared as follows. At first, 88 wt % of the first silicon nitride powder of Example 1 was mixed with 6.0 wt % of yttrium oxide and 6.0 wt % of aluminum oxide, so as to prepare a first powder mixture. The first granulated-grains having an average diameter of 60 μm were prepared from this powder mixture in the same manner as in Example 1.

Separately, second granulated-grains were prepared as follows. At first, 48 wt % of the second silicon nitride powder of Example 1 was mixed with 6.0 wt % of yttrium oxide, 6.0 wt % of neodymium oxide and 40.0 wt % of a silicon carbide having an average diameter of 1.2 μm, so as to prepare a second powder mixture. The second granulated-grains having an average diameter of 120 μm were prepared from this powder mixture in the same manner as in Example 1.

The thus prepared first and second granulated-grains were mixed together at a weight ratio of the former to the latter of 70:30 by a V type mixer for 60 min, so as to prepare a composite mixture. Then, this composite mixture was subjected to the same hot-pressing as in Example 6, so as to prepare a sintered composite.

Then, this sintered composite was subjected to the same treatments as those of Example 1. Then, the same measurements as those of Example 1 were conducted. The results are shown in Table 3.

COMPARATIVE EXAMPLE 4

In this comparative example, Example 1 was modified as follows. That is, the first and second granulated-grains were modified in their composition; and hot-pressing was used in place of gas pressure sintering. In fact, the first granulated-grains of this comparative example has an average diameter (8 μm) which is out of the range (10–50 μm) of the invention.

First granulated-grains were prepared as follows. At first, 99.85 wt % of the first silicon nitride powder of Example 1 was mixed with 0.1 wt % of yttrium oxide and 0.05 wt % of aluminum oxide, so as to prepare a first powder mixture. The first granulated-grains having an average diameter of 8 μm were prepared from this powder mixture in substantially the same manner as in Example 1. In fact, after the drying, the first granulated-grains were sieved to get the above average diameter.

Separately, second granulated-grains were prepared as follows. At first, 97 wt % of the second silicon nitride powder of Example 1 was mixed with 1.6 wt % of yttrium oxide, 1.0 wt % of aluminum oxide and 0.4 wt % of a silicon carbide powder having an average diameter of 0.01 μm, so as to prepare a second powder mixture. The second granulated-grains having an average diameter of 30 μm were prepared from this powder mixture in the same manner as in Example 1.

The thus prepared first and second granulated-grains were mixed together at a weight ratio of the former to the latter of 30:70 by a V type mixer for 60 min, so as to prepare a composite mixture. Then, this composite mixture was subjected to the same hot-pressing as in Example 6, except in that the gas pressure was 10 atm. and that the pressure load was 10 MPa, so as to prepare a sintered composite.

Then, this sintered composite was subjected to the same treatments as those of Example 1. Then, the same measurements as those of Example 1 were conducted. The results are shown in Table 3.

COMPARATIVE EXAMPLE 5

In this comparative example, Example 1 was modified as follows. That is, the first and second granulated-grains of Example 2 were used; and hot-pressing was used in place of gas pressure sintering.

The first and second granulated-grains of Example 2 were mixed together at a weight ratio of the former to the latter of 30:70 by a V type mixer for 60 min, so as to prepare a composite mixture. Then, this composite mixture was subjected to the same hot-pressing as in Example 6, except in that the sintering temperature was 1,500° C., so as to prepare a sintered composite.

Then, this sintered composite was subjected to the same treatments as those of Example 1. Then, the same measurements as those of Example 1 were conducted. The results are shown in Table 3.

COMPARATIVE EXAMPLE 6

In this comparative example, Example 1 was modified as follows. That is, the first and second granulated-grains of Example 2 were used; and the gas pressure sintering was modified in its condition.

The first and second granulated-grains of Example 2 were mixed together at a weight ratio of the former to the latter of 30:70 by a V type mixer for 60 min, so as to prepare a composite mixture. Then, this composite mixture was subjected to the same rubber press as in Example 1, so as to prepare a shaped body having the same size as in Example 1. Then, this shaped body was subjected to the same gas pressure sintering of Example 1, except in that the sintering temperature was 2,200° C., that the sintering time was 2 hr and that the gas pressure was 1,000 atm., so as to prepare a sintered composite.

Then, this sintered-composite was subjected to the same treatments as those of Example 1. Then, the same measurements as those of Example 1 were conducted. The results are shown in Table 3.

COMPARATIVE EXAMPLE 7

In this comparative example, Example 1 was modified as follows. That is, the first and second granulated-grains of Example 2 were used; and HIP was used in place of gas pressure sintering.

The same composite mixture as that of Comparative Example 6 was prepared. Then, this composite mixture was subjected to the same rubber press as in Example 3, so as to prepare a shaped body having the same size as in Example 3. Then, this shaped body was subjected to the same HIP of Example 3, except in that the gas pressure was 50 atm., so as to prepare a sintered composite.

Then, this sintered composite was subjected to the same treatments as those of Example 1. Then, the same measurements as those of Example 1 were conducted. The results are shown in Table 3.

COMPARATIVE EXAMPLE 8

In this comparative example, Example 1 was modified as follows. That is, the first and second granulated-grains of Example 2 were used; and hot-pressing was used in place of gas pressure sintering.

The same composite mixture as that of Comparative Example 6 was prepared. Then, this composite mixture was subjected to the same hot-pressing as in Example 3, except in that the sintering temperature was 2,200° C. and that the gas pressure was 150 atm., so as to prepare a sintered composite.

Then, this sintered composite was subjected to the same treatments as those of Example 1. Then, the same measurements as those of Example 1 were conducted. The results are shown in Table 3.

TABLE 1

|  | Example 1 | Com. Ex. 1-1 | Com. Ex. 1-2 | Example 2 | Com. Ex. 2-1 | Com. Ex. 2-2 |
|---|---|---|---|---|---|---|
| Porosity of Sintered Composite (%) | 1.2 | 0.5 | 1.8 | 0.2 | 0.2 | 1.2 |
| Three-point Bending Test at Room Temp (MPa) | 950 | 1,050 | 1,240 | 1,210 | 1,350 | 1,250 |
| Three-point Bending Test at 1,400° C. (MPa) | 920 | 620 | 980 | 1,050 | 720 | 1,020 |
| Fracture Toughness (MPa$\sqrt{m}$) | 8.8 | 10.8 | 4.8 | 9.8 | 9.2 | 6.2 |
| Average Diameter of Aggregates (μm) | 38 | — | — | 38 | — | — |
| Area of Aggregates (% by area)[1] | 25 | 100 | 0 | 55 | 100 | 0 |
| Area of Larger Grains (% by area)[2] | 15[4] | 48[5] | 1.0[5] | 8[4] | 35[5] | 2.5[5] |
| Area of Still-larger Grains (% by area)[3] | 2.5[4] | 8.2[5] | 0[5] | 0.5[4] | 5.9[5] | 0[5] |

[1] "Area of Aggregates" is the percentage of the total area of the aggregates on a two-dimensional section of the sintered composite, based on the total area of the section.
[2] "Area of Larger Grains" is the percentage of the total area of the larger grains on a two-dimensional section.
[3] "Area of Still-larger Grains" is the percentage of the total area of the still-larger grains on a two-dimensional section.
[4] Based on the total area of the aggregates on the section.
[5] Based on the total area of the section.

TABLE 2

|  | Example 3 | Example 4 | Example 5 | Example 6 | Example 7 | Example 8 |
|---|---|---|---|---|---|---|
| Porosity of Sintered Composite (%) | 0.4 | 1.2 | 1.5 | 0.8 | 1.4 | 1.8 |
| Three-point Bending Test at Room Temp. (MPa) | 1,040 | 950 | 1,080 | 1,100 | 970 | 920 |
| Three-point Bending Test at 1,400° C. (MPa) | 920 | 920 | 980 | 940 | 920 | 900 |
| Fracture Toughness (MPa$\sqrt{m}$) | 8.4 | 8.8 | 9.2 | 9.5 | 8.6 | 9.5 |
| Average Diameter of Aggregates (μm) | 10 | 50 | 38 | 33 | 43 | 15 |
| Area of Aggregates (% by area)[1] | 58 | 25 | 25 | 28 | 52 | 29 |
| Area of Larger Grains (% by area)[2] | 35[4] | 15[4] | 15[4] | 12[4] | 32[4] | 40[4] |
| Area of Still-larger Grains (% by area)[3] | 1.5[4] | 2.5[4] | 2.5[4] | 4.0[4] | 0.5[4] | 4.8[4] |

TABLE 3

|  | Com. Ex. 3 | Com Ex. 4 | Com. Ex. 5 | Com. Ex. 6 | Com. Ex. 7 | Com. Ex. 8 |
|---|---|---|---|---|---|---|
| Porosity of Sintered Composite (%) | 0.4 | 8.5 | 5.5 | 7.5 | 3.8 | 4.3 |
| Three-point Bending Test at Room Temp. (MPa) | 940 | 450 | 630 | 480 | 770 | 580 |
| Three-point Bending Test at 1,400° C. (MPa) | 330 | 320 | 480 | 430 | 640 | 420 |
| Fracture Toughness (MPa$\sqrt{m}$) | 9.1 | 2.8 | 3.5 | 2.8 | 6.2 | 4.2 |
| Average Diameter of Aggregates (μm) | 65 | 10 | 42 | 40 | 35 | 38 |

TABLE 3-continued

|  | Com. Ex. 3 | Com Ex. 4 | Com. Ex. 5 | Com. Ex. 6 | Com. Ex. 7 | Com. Ex. 8 |
| --- | --- | --- | --- | --- | --- | --- |
| Area of Aggregates (% by area)[1] | 65 | 30 | 28 | 25 | 28 | 31 |
| Area of Larger Grains (% by area)[2] | 20[4] | 2[4] | 0[4] | 45[4] | 8[4] | 18[4] |
| Area of Still-larger Grains (% by area)[3] | 3[4] | 0[4] | 0[4] | 12[4] | 1[4] | 1[4] |

What is claimed is:

1. A sintered composite of silicon carbide and silicon nitride, said composite comprising:

a polycrystalline matrix including silicon carbide grains, first silicon-nitride grains and a first sintering aid thereof; and polycrystalline aggregates dispersed in said matrix, each of said aggregates including second silicon-nitride grains and a second sintering aid thereof, wherein said aggregates have an average diameter within a range from 10 µm to 50 µm, said average diameter being defined as a diameter of a circle having an area which is the same as the average area of said aggregates on a two-dimensional section of said composite.

2. A sintered composite according to claim 1, wherein the total area of said aggregates on said section is within a range from 10% to 60% by area, based on the total area of said section.

3. A sintered composite according to claim 1, wherein said second silicon-nitride grains comprise columnar grains made of $\beta$-$Si_3N_4$, having an average diameter within a range from 3 µm to 10 µm and an average axial length within a range from 10 µm to 50 µm, the total area of said columnar grains on said section being within a range from 5% to 40% by area, based on the total area of said aggregates on said section.

4. A sintered composite according to claim 1, wherein said second silicon-nitride grains comprise columnar grains which are made of $\beta$-$Si_3N_4$ having an average axial length longer than 50 µm, the total area of said columnar grains on said section being within a range from 0 to 5% by area, based on the total area of said aggregates on said section.

5. A sintered composite according to claim 1, wherein said silicon carbide grains have an average diameter within a range from 0.01 µm to 1.0 µm, the total volume of said silicon carbide grains is within a range from 0.5 to 30%, based on the total volume of said composite.

6. A sintered composite according to claim 1, wherein said composite being prepared by the method comprising:

(a) mixing a first silicon-nitride powder with 0.2–10% by weight of a first sintering aid, based on the total weight of said first silicon-nitride powder and said first sintering aid, said first sintering aid being at least one oxide or nitride selected from the group consisting of aluminum oxide, magnesium oxide, calcium oxide, zirconium oxide, aluminum nitride, and oxides of elements of the group IIIa of the periodic table of elements, so as to prepare a first powder mixture;

(b) granulating said first powder mixture into first granulated-grains having an average diameter within a range from 10 µm to 50 µm;

(c) mixing a second silicon-nitride powder with 0.2–10% by weight of a second sintering aid and 0.5–30% by weight of a silicon carbide powder, based on the total weight of said second silicon-nitride powder, said second sintering aid and said silicon carbide powder, said second sintering aid being at least one oxide or nitride selected from the group consisting of aluminum oxide, magnesium oxide, calcium oxide, zirconium oxide, aluminum nitride, and oxides of elements of the group IIIa of the periodic table of elements, so as to prepare a second powder mixture;

(d) optionally granulating said second powder mixture into optional second granulated-grains having an average diameter not larger than 100 µm;

(e) mixing 10–60% by weight, based on the total weight of said first granulated-grains and said second powder mixture and/or said optional second granulated-grains, of said first granulated-grains with said second powder mixture and/or said optional second granulated-grains, so as to prepare a composite mixture;

(f) optionally shaping said composite mixture so as to prepare a shaped body; and (g) sintering said composite mixture or said shaped body at a temperature within a range from 1,600° to 2,100° C., so as to prepare said sintered composite.

* * * * *